(12) United States Patent
Iwasaki et al.

(10) Patent No.: US 8,664,902 B2
(45) Date of Patent: Mar. 4, 2014

(54) POLYPHASE AC MOTOR, DRIVING DEVICE AND DRIVING METHOD THEREFOR

(75) Inventors: Norihisa Iwasaki, Hitachinaka (JP); Junnosuke Nakatsugawa, Hitachi (JP); Yoshitaka Iwaji, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 58 days.

(21) Appl. No.: 13/264,076

(22) PCT Filed: Apr. 16, 2009

(86) PCT No.: PCT/JP2009/001762
§ 371 (c)(1),
(2), (4) Date: Oct. 12, 2011

(87) PCT Pub. No.: WO2010/119483
PCT Pub. Date: Oct. 21, 2010

(65) Prior Publication Data
US 2012/0038301 A1 Feb. 16, 2012

(51) Int. Cl.
*H02K 29/06* (2006.01)
(52) U.S. Cl.
USPC ............ 318/400.23; 318/400.02; 318/400.07; 318/608
(58) Field of Classification Search
USPC ........... 318/400.23, 400.07, 608, 490, 400.02
See application file for complete search history.

(56) References Cited

U.S. PATENT DOCUMENTS

| | | | |
|---|---|---|---|
| 6,426,602 B1 * | 7/2002 | McCann et al. | 318/432 |
| 7,649,298 B2 * | 1/2010 | Enomoto et al. | 310/257 |
| 7,960,927 B2 * | 6/2011 | Chen | 318/400.07 |
| 2004/0056632 A1 * | 3/2004 | Nakatsugawa et al. | 318/801 |
| 2005/0201129 A1 * | 9/2005 | Nakatsugawa et al. | 363/131 |
| 2008/0018196 A1 | 1/2008 | Enomoto et al. | |
| 2008/0136272 A1 | 6/2008 | Ishikawa et al. | |
| 2009/0236930 A1 * | 9/2009 | Nashiki | 310/257 |

FOREIGN PATENT DOCUMENTS

| | | |
|---|---|---|
| EP | 1 931 013 A2 | 6/2008 |
| JP | 63-157685 A | 6/1988 |
| JP | 2-136096 A | 5/1990 |
| JP | 10-191677 A | 7/1998 |
| JP | 2001-37282 A | 2/2001 |

(Continued)

OTHER PUBLICATIONS

Corresponding International Search Report with English Translation dated Jul. 21, 2009 (eight (8) pages).

(Continued)

*Primary Examiner* — Eduardo Colon Santana
*Assistant Examiner* — Bickey Dhakal
(74) *Attorney, Agent, or Firm* — Crowell & Moring LLP

(57) ABSTRACT

Provided is an AC motor in a three-phase unbalanced state such as a claw-teeth type AC motor (108), which is reduced in magnetic flux pulsations and torque pulsations. Among the current command values of individual phases to be intrinsically given to an inverter (106) for feeding three-phase alternating currents of variable voltages/frequencies to the electric motor, a current command of an intermediate phase (a V-phase) having a smaller magnetic resistance of a stator core than those of other phases is subjected to a reducing correction by a correction unit (102) on the basis of the correction amount calculated by a current correction amount calculating unit (103), and the unbalanced three-phase alternating currents are fed to the AC motor (108), so that magnetic flux pulsations of a secondary electric angle and torque pulsations of the same order are reduced.

12 Claims, 13 Drawing Sheets

(56) References Cited

FOREIGN PATENT DOCUMENTS

| | | |
|---|---|---|
| JP | 2006-246601 A | 9/2006 |
| JP | 2008-29142 A | 2/2008 |
| JP | 2008-148397 A | 6/2008 |
| WO | WO 2006118219 A1 * | 11/2006 |

OTHER PUBLICATIONS

Japanese Office Action dated Jun. 4, 2013 with partial English translation (Six (6) pages).

* cited by examiner

POLYPHASE AC MOTOR, DRIVING DEVICE AND DRIVING METHOD THEREFOR

FIELD OF THE INVENTION

The present invention relates to a polyphase AC motor in an unbalanced state and a driving device and a driving method therefor.

BACKGROUND OF THE INVENTION

The polyphase AC motor, particularly a permanent magnet synchronous motor is extended in the range of applicable uses to household electric appliances, industries, motorcars, etc. by utilizing the characteristics such as a small size and high efficiency. Particularly in recent years, electric motors having a driving system changed from the square wave power supply type to the sine wave power supply type are increased and controllers requiring the input of electric constant set values of an electric motor such as resistance, inductance, and induced voltage constant for uses of rotor position inference under the position sensorless control and high precision torque control are increased. Therefore, unless the electric constants of the electric motor are identified and input accurately, the control performance is greatly affected. Among them, particularly the inductance is greatly affected by the magnetic nonlinearity of the core and is very dependent upon the magnetic saturation.

Under such a condition, aiming to realize miniaturization and cut-down of cost of the electric motor, for example, as disclosed in Patent Literature 1, a claw-teeth type motor composed of a stator of a circular claw magnetic core formed with a dust core and a rotor arranged in the ring of the stator is developed. However, as described even in Patent Literature 1, the claw-teeth type motor, since the stators having three independent phases are overlaid by each other in the axial direction, is smaller in the magnetic resistance of the intermediate phase than other phases and has a three-phase unbalanced property in principle. Therefore, magnetic flux pulsations of a secondary electric angle (two cycles per each cycle of the electric angle) are generated and furthermore, torque pulsations of the same order are caused.

Arts for reducing the magnetic flux pulsations and torque pulsations of the claw-teeth type motor are disclosed in Patent Literature 1 and Patent Literature 2.

Firstly, Patent Literature 1 discloses an art, from the structure that the individual phases are adjacent to each other in the axial direction, for balancing the magnetic resistance of the claw-teeth type motor of three-phase unbalance by inserting a magnetic insulating material composed of a non-magnetic substance between the phases. A characteristic of the claw-teeth type motor is a structure that the stators of three independent phases are adjacent to each other in the axial direction, thus the magnetic resistance of the intermediate phase is small, and three-phase unbalance is caused. Therefore, the prior art 1 inserts a magnetic insulating material between the phases, thereby realizes magnetic insulation, balances the three phases, thereby reduces the magnetic flux pulsations of the secondary electric angle, furthermore the torque pulsations of the same order.

Further, in Patent Literature 2, an art of calculating the torque pulsations beforehand by a torque pulsation calculating means, adding the waveform of the opposite phase from the calculated torque pulsation component to the command value, and reducing the pulsation component is disclosed. In the prior art 2, the pulsation characteristic is obtained beforehand using the torque pulsation calculating means of the electric motor, and it is added to a torque pulsation command at the time of driving, thus the torque pulsations are reduced.

LITERATURES OF PRIOR ART

Prior Patent Documents

Patent Document 1: Japanese Patent Laid-open No. 2008-29142
Patent Document 2: Japanese Patent Laid-open No. 2006-246601

SUMMARY OF THE INVENTION

A problem of the prior art is that by the means for realizing magnetic insulation between the phases, the length in the axial direction is increased and as a result, the size of the electric motor is increased.

Further, the means for calculating the torque pulsations beforehand by the torque pulsation calculating means and adding the waveform of the opposite phase to the command value is difficult in the calculation of torque pulsations, increases in the number of times of measurement and analytical operation, thereby becomes complicated.

The present invention was developed with the forging respects in view and is intended to provide a polyphase AC motor for simply correcting a command value of a current or a voltage which is intrinsically necessary, thereby realizing use for AC motor control and a driving device and a driving method therefor.

The present invention, in an aspect thereof, is a driving device of an AC motor including a polyphase AC motor having polyphase stator magnetic poles, in which stator magnetic poles are formed independently for each phase, an inverter for supplying polyphase alternating currents of variable voltages/frequencies due to pulse width modulation to the electric motor, and a control unit for controlling the inverter, wherein the control unit is characterized in that it has a correction unit for putting the amplitude and/or phase of an alternating current to be supplied to at least one phase of the stator magnetic poles into an unbalanced state with the amplitudes and/or phases of the alternating currents to be supplied to other phases.

In a preferred embodiment of the present invention, the correction unit is structured so as to supply an alternating current with an amplitude different from those of stator coils of other phases to a stator coil of at least one phase in which the magnitude of the magnetic resistance of the stator magnetic poles of the polyphase AC motor is different from those of other phases.

A most suitable polyphase AC motor for application of the present invention is a claw-teeth type m-phase AC motor including a plurality of upper side and lower side claw magnetic poles installed inside the stator core, a stator magnetic pole of one phase structured so as to get caught in a ring-shaped coil between the upper side and lower side claw magnetic poles, stator magnetic poles of m phases structured so as to arrange the stator magnetic pole of one phase in the axial direction by shifting it at an interval of $2\pi/m$ of an electric angle, and rotors supported rotatably via predetermined air gaps on the inner periphery side of the claw magnetic poles.

In a preferred embodiment of the present invention, the correction unit is structured so as to input output of a correction amount calculating unit for calculating the correction amount on the basis of results of preanalysis or premeasurement and correct it in the unbalanced state according to the input.

Another preferred embodiment of the present invention includes a voltage measuring instrument for measuring the voltage supplied to the polyphase AC motor from the inverter during run and a command value computing unit for inputting the output of the voltage measuring instrument and computing a command value for putting it into an unbalanced state.

In the present invention, among the disclosed inventions, the effects obtained by a typical one will briefly be explained below.

According to the preferred embodiments of the present invention, without increasing the size of the electric motor and using a complicated torque pulsation calculating means, by approaching from a control side, a pulsation reduction can be realized.

As a concrete method, a command value of generating an alternating current for reducing pulsations is expressed by a simple formula and is incorporated in the control, thus the magnetic flux pulsations of the secondary electric angle, furthermore the torque pulsations of the same order can be reduced.

The other objects and characteristics of the present invention will be made clear in the embodiments described below.

DESCRIPTION OF THE PREFERRED EMBODIMENTS

Next, by referring to FIGS. 1 to 14, the embodiments of the driving device of the polyphase AC motor of the present invention will be explained. Further, in the following embodiments, as an AC motor, a claw-teeth type motor is used for explanation, though also for other electric motors (electric motors causing magnetic unbalance in principle), the present invention can be realized similarly.

(First Embodiment)

Figure 1:
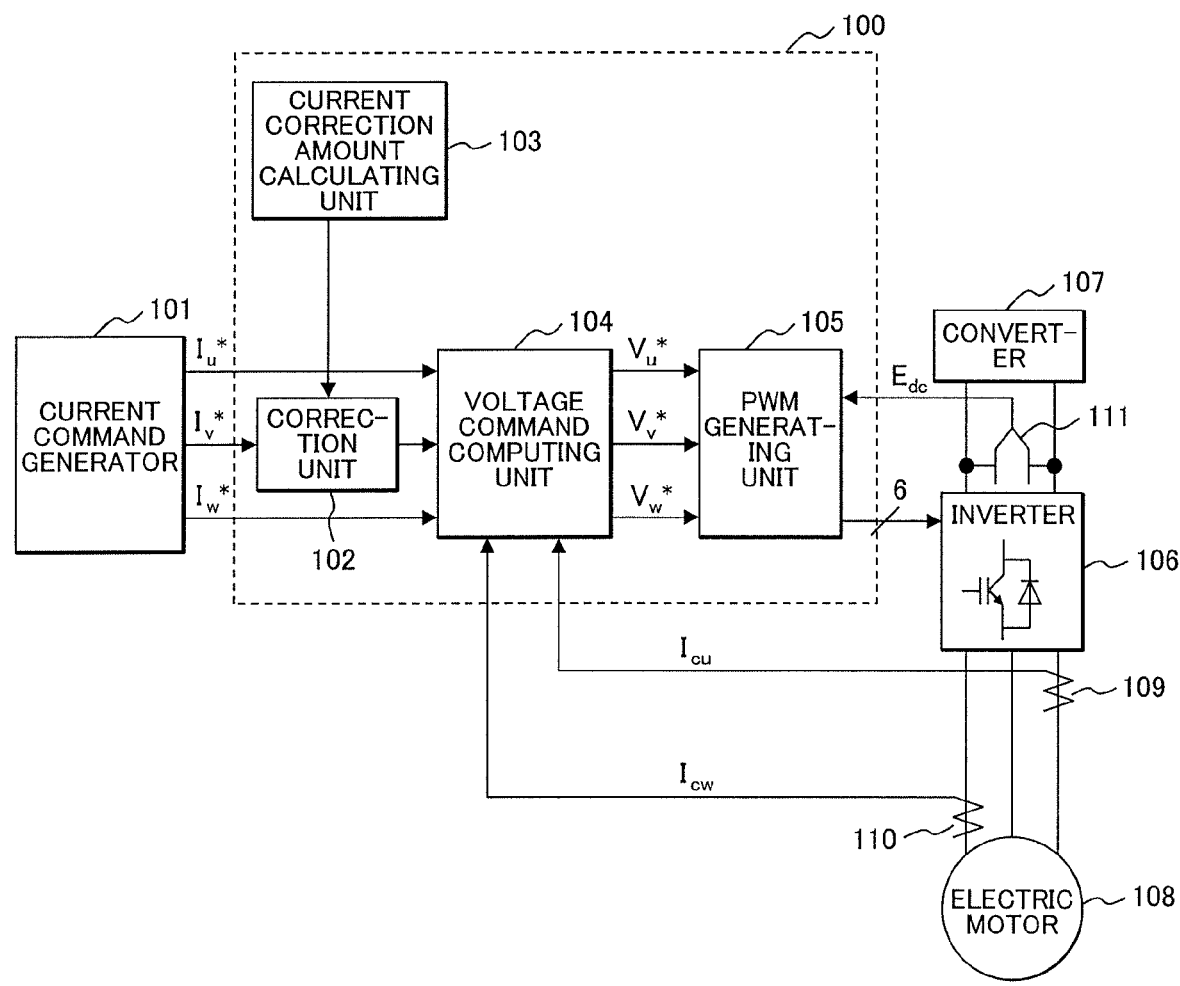
FIG. 1 is a block diagram showing the system constitution of the first embodiment of the driving device of the polyphase AC motor of the present invention.

FIG. 1 is a block diagram showing the system constitution of the first embodiment of the driving device of the polyphase AC motor of the present invention. The controller of the driving device of the first embodiment includes a current command generator (101) for generating a command value of a current to be fed to the electric motor and a control unit (100) for generating a pulse width modulation signal (hereinafter, abbreviated to a PWM signal) from the current command value. The main circuit includes an inverter (106) driven by the PWM signal, a converter (107) for feeding a DC voltage to the inverter (106), and a claw-teeth type motor (108) to be controlled. Further as auxiliary devices for control, U-phase and V-phase current detectors (109) and (110) for detecting U-phase and V-phase currents fed to the claw-teeth type motor (108) from the inverter (106) and a voltage detector for detecting an input voltage Edc of the inverter (106) are included.

To the control unit (100), by the present invention, a correction unit (102) for correcting the current value of the intermediate phase (the V-phase) and a current correction amount calculating unit (103) for calculating the current value to be corrected are added. The intrinsic controller is composed of a voltage command computing unit (104) for computing an AC supply voltage command value supplied from the current command value to the electric motor and a PWM generating unit (105) for converting the AC supply voltage command value to a pulse width modulation signal (hereinafter, abbreviated to a PWM signal) and outputting it.

Next, as for the drive system shown in FIG. 1, the operation thereof will be explained.

Firstly, by the current command generator (101) shown in FIG. 1, current command values of the respective U-phase, V-phase, and W-phase are generated. Next, by the correction unit (102), the current command value of the intermediate phase (the V-phase) is corrected. The current command value to be corrected is calculated by the current correction amount calculating unit (103). From the current command values of the respective three phases including the corrected current command value of the intermediate phase, the voltage command values are computed by the voltage command computing unit (104). The computed voltage command values are converted to a PWM signal by the PWM generating unit (105). To the inverter (106), the DC voltage Edc is fed via the converter (107) and the PWM signals generated by the PWM generating unit (105) are fed, thus the inverter (106) feeds three-phase alternating currents of variable voltages/frequencies to the claw-teeth type motor (108) and drives it. Here, a current value Icu of the U-phase is detected by the U-phase current detector (109), and a current value Icw of the W-phase is detected by the W-phase current detector (110), and both current values are fed back to the voltage command computing unit (104) and are used for voltage command value calculation.

Here, the effects of the correction unit (102) that is an essential section of the present invention will be explained.

In the claw-teeth type motor (108), the magnetic resistance of the intermediate phase (the V-phase) is small, and magnetic three-phase unbalance is caused in principle, and then the magnetic flux pulsations of the secondary electric angle are generated, and furthermore the torque pulsations of the same order are caused. To reduce the magnetic flux pulsations and torque pulsations, the correction unit (102) is installed. It is set so as to change the amplitude of the current command value by a current command correction amount ΔI of the intermediate phase. ΔI, on the basis of analysis and measurement results by a prior simulation, is calculated by the current correction amount calculating unit (103) and is given to the correction unit (102), thus a reduction in the magnetic flux pulsations of the secondary electric angle and the torque pulsations of the same order can be realized.

Concretely, using the next formula (1), the V-phase current command value is reduced.

Formula 1

$$i_u = -I_1 \sin\theta_d$$
$$i_v = -(I_1 \mp \Delta I)\sin\left(\theta_d - \frac{2}{3}\pi\right)$$
$$i_w = -I_1 \sin\left(\theta_d + \frac{2}{3}\pi\right)$$
(1)

Here, in the case that the current fundamental wave vector is pointed in the q axial direction, the current value is reduced using Formula (1). A symbol θd shown in Formula (1), on the basis of the U-phase winding axis, indicates an angle from the basis to the d-axis. Here, to reduce the pulsations of the secondary electric angle that is peculiar to the claw-teeth type motor, a method for supplying alternating currents with different amplitudes to the intermediate phase will be explained. With respect to "minus/plus" shown in the formula, when the magnetic resistance of the intermediate phase is small, "minus" is used and inversely, when the magnetic resistance of the intermediate phase is large, "plus" is used.

Further, in the case of control of an electric motor having a structure that the magnetic resistance of the U-phase is different (when the magnetic resistance is small or large), Formula (2) is used.

Formula 2

$$i_u = -(I_1 \mp \Delta I)\sin\theta_d$$
$$i_v = -I_1 \sin\left(\theta_d - \frac{2}{3}\pi\right)$$
$$i_w = -I_1 \sin\left(\theta_d + \frac{2}{3}\pi\right)$$
(2)

Similarly, in the case of an electric motor having a structure that the magnetic resistance of the W-phase is different (when the magnetic resistance is small or large), Formula (3) is used.

Formula 3

$$i_u = -I_1 \sin\theta_d$$
$$i_v = -I_1 \sin\left(\theta_d - \frac{2}{3}\pi\right)$$
$$i_w = -(I_1 \mp \Delta I)\sin\left(\theta_d + \frac{2}{3}\pi\right)$$
(3)

Further, when an electric motor is composed of individual phases structured independently like the claw-teeth motor, there is a case that the phase relationship of the individual phases is not balanced due to a mounting position error of the individual phases. Such a case can be coped with by changing the phase given in Formulas (1) to (3). For example, when the mounting position of the U-phase is a position advanced by α° of an electric angle, by use of Formula (4), the pulsations can be reduced.

Formula 4

$$i_u = -I_1 \sin(\theta_d + \alpha)$$
$$i_v = -(I_1 \mp \Delta I)\sin\left(\theta_d - \frac{2}{3}\pi\right)$$
$$i_w = -I_1 \sin\left(\theta_d + \frac{2}{3}\pi\right)$$
(4)

Here, with respect to ΔI, on the basis of analysis and measurement results by a prior simulation, the rate of a current amplitude $I_1$, for example, as a percentage of n [%], may be calculated by Formula (5).

Formula 5

$$\Delta I = n[\%] \times I_1$$
(5)

As for the percentage n [%] at this time, two cases may be considered such as a case that it is a percentage at the time of a certain current amplitude and is assumed as fixed and a case that the percentage n [%] is changed in correspondence to change in the current amplitude $I_1$.

(Second Embodiment)

Figure 2:
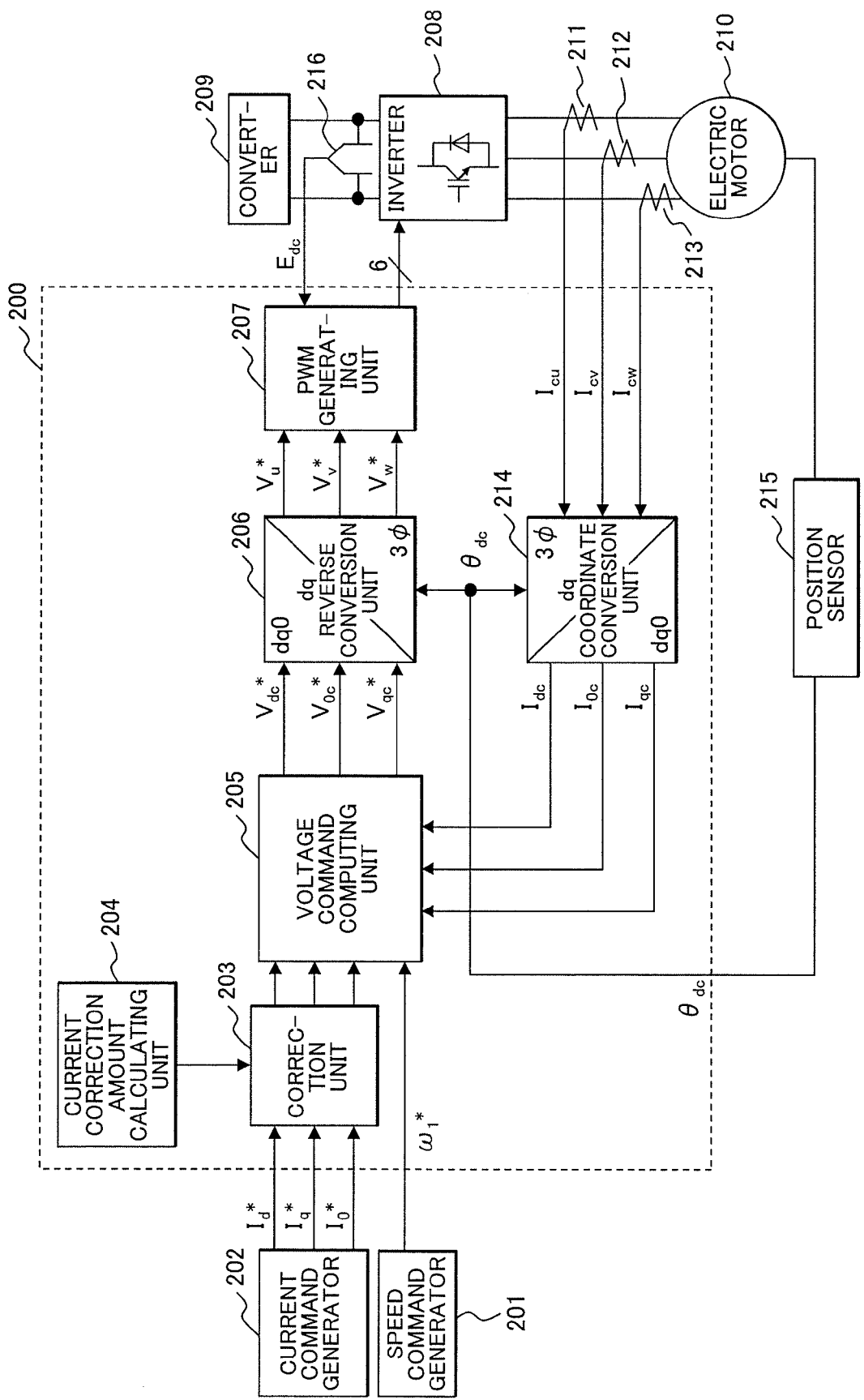
FIG. 2 is a block diagram showing the system constitution of the second embodiment of the driving device of the polyphase AC motor of the present invention.

FIG. 2 is a block diagram showing the system constitution of the second embodiment of the driving device of the polyphase AC motor of the present invention. The controller of the driving device of the second embodiment includes a speed command generator (201) for generating a speed command value for deciding the speed of the rotor of the electric motor, a current command generator (202) for generating current command values of the d-axis, q-axis, and 0-phase, and a control unit (200) for adjusting a PWM signal from the command value. As a main circuit, a converter (209) for feeding a DC voltage to an inverter (208), the inverter (208) driven by the PWM signal, and a claw-teeth type motor (210) to be controlled are included. Further, as auxiliary devices for control, U-phase to W-phase current detectors (211) to (213) for detecting U-phase to W-phase currents fed to the electric motor (210) from the inverter (208), a position sensor (215) for detecting the position of the rotor of the electric motor, and a voltage detector (216) for detecting an inverter input voltage Edc are included.

To the control unit (200), by the present invention, a correction unit (203) for correcting respectively the d-axis current, q-axis current, and 0-phase current and a current correction amount calculating unit (204) for calculating the current value to be corrected are added. Further, the control unit (200), as an intrinsic controller, includes a voltage command computing unit (205) for computing voltage command values of the d-axis, q-axis, and 0-phase from the respective command values, a dq reverse conversion unit (206) for converting the computed voltage command values to values on the three-phase alternating current axis, a PWM generating unit (207) for generating a PWM signal from the voltage command values converted by the dq reverse conversion unit (206), and a dq coordinates conversion unit (214) for converting the respective current values on the three-phase alternating current axis which are detected by the electric motor to components on the dc-qc axis which is a rotation axis of coordinates.

As for the drive system shown in FIG. 2, the operation thereof will be explained.

Firstly, by the speed command generator (201) shown in FIG. 2, a speed command is generated and by the current command generator (202), the current command values of the d-axis, q-axis, and 0-phase are generated. The generated command values are corrected via the correction unit (203). The values used for correction are calculated by the current correction amount calculating unit (204). The current command values corrected by the correction unit (203) and the speed command value are computed to voltage command values by the voltage command computing unit (205). The computed voltage command values are converted to values on the three-phase alternating current axis from the values on the rotation axis of coordinates by the dq reverse conversion unit (206). The converted voltage command values of the respective three phases are converted to PWM signals by the PWM generating unit (207).

To the inverter (208), a DC voltage is supplied via the converter (209) and a PWM signal is given from the PWM generating unit (207), thus the inverter (208) is driven and feeds three-phase alternating currents of variable voltages/frequencies to the claw-teeth type motor (210).

The U-phase to W-phase current values are detected by the U-phase to W-phase current detectors (211) and (213). In this case, the electric motor is assumed not to be Y-connected, so that a detector is necessary for the respective three phases. The detected current values are converted from the values on the three-phase alternating current axis of coordinates to values on the rotation axis of coordinates by the dq coordinates conversion unit (214). The respective converted current values are fed back and are used for voltage command value calculation. Further, the position of the rotor is detected by a position sensor (215) and the obtained values are used for calculation at the time of dq coordinates conversion or dq reverse conversion.

Here, the effects of the correction unit (203) that is an essential section of the present invention will be explained.

In the claw-teeth type motor (210), the magnetic resistance of the intermediate phase (the V-phase) is small, and magnetic three-phase unbalance is caused in principle, and then the magnetic flux pulsations of the secondary electric angle are generated, and the torque pulsations of the same order are caused. To reduce the magnetic flux pulsations and torque pulsations, the correction unit (203) is installed. However, in the case of FIG. 2, unlike FIG. 1, the command values are converted from the values on the three-phase alternating current axis of coordinates to the values on the rotation axis of coordinates, so that respectively for the d-axis current command value, q-axis current command value, and 0-phase current value, the correction calculation is necessary. The value of $\Delta I$ that is necessary at that time, on the basis of analysis and measurement results by a prior simulation, is calculated by the current correction amount calculating unit (204). The calculated value is given to the correction unit (203), thus a reduction in the magnetic flux pulsations of the secondary electric angle and the torque pulsations of the same order is realized.

Here, in the case that the current fundamental wave vector is pointed in the q axial direction, the current command value is reduced using Formula (6).

Formula 6

$$i_d = \pm \frac{\Delta I}{3}\cos(2\theta_d + \frac{\pi}{6})$$
$$i_q = I_1 \mp \frac{\Delta I}{3} \mp \frac{\Delta I}{3}\sin(2\theta_d + \frac{\pi}{6})$$
$$i_0 = \mp \frac{\Delta I}{3}\cos(\theta_d - \frac{\pi}{6})$$
(6)

A symbol $\theta d$ shown in Formula (6), on the basis of the U-phase winding axis, indicates an angle from the basis to the d-axis. Here, to reduce the pulsations of the secondary electric angle that is peculiar to the claw-teeth type motor (210), a method for superposing alternating currents with different amplitudes on the intermediate phase will be explained. Similarly to the aforementioned, with respect to "minus/plus" shown in the formula, when the magnetic resistance of the intermediate phase is small, "minus" is used and inversely, when the magnetic resistance of the intermediate phase is large, "plus" is used.

Further, in the case of control of an electric motor having a structure that the magnetic resistance of the U-phase is different from those of other phases, Formula (7) is used.

Formula 7

$$i_d = \pm \frac{\Delta I}{3}\sin(2\theta_d)$$
$$i_q = I_1 \mp \frac{\Delta I}{3} \pm \frac{\Delta I}{3}\cos(2\theta_d)$$
$$i_0 = \pm \frac{\Delta I}{3}\sin(\theta_d)$$
(7)

Similarly, in the case of an electric motor having a structure that the magnetic resistance of the W-phase is different from those of other phases, Formula (8) is used.

Formula 8

$$i_d = \pm \frac{\Delta I}{3}\cos(2\theta_d - \frac{\pi}{6})$$
$$i_q = I_1 \mp \frac{\Delta I}{3} \pm \frac{\Delta I}{3}\sin(2\theta_d - \frac{\pi}{6})$$
$$i_0 = \pm \frac{\Delta I}{3}\cos(\theta_d + \frac{\pi}{6})$$
(8)

In the correction by these Formulas (6) to (8), among the d-axis, q-axis, and 0-phase, onto at least one of the d-axis and q-axis, an alternating current of the secondary electric angle is superposed and onto the 0-phase, a primary alternating current is superposed.

Further, as mentioned above, when an electric motor is composed of individual phases structured independently like the claw-teeth motor, there is a case that the phase relationship of the individual phases is not balanced due to a mounting position error of the individual phases. In such a case, pulsations of the second electric angle are generated, so that in the similar concept to Formula (4), the unbalance can be coped with by changing the phase given in Formulas (6) to (8).

Further, the correction amount ΔI in Formulas (6) to (8) is calculated similarly to Formula (5).

(Third Embodiment)

Figure 3:
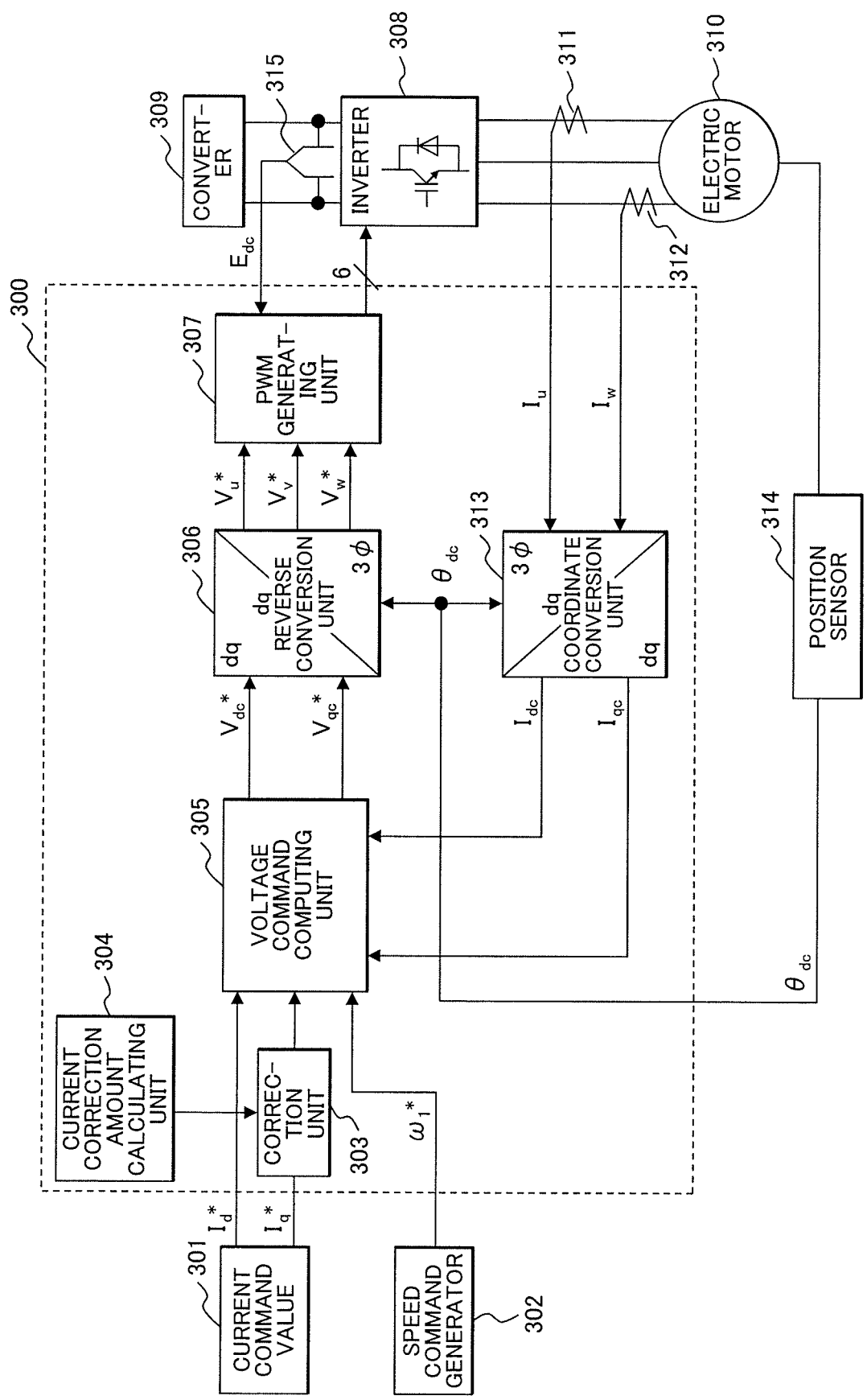
FIG. 3 is a block diagram showing the system constitution of the third embodiment of the driving device of the polyphase AC motor of the present invention.

FIG. 3 is a block diagram showing the system constitution of the third embodiment of the driving device of the polyphase AC motor of the present invention. The controller of the driving device of the third embodiment includes a current command generator (301) for generating current command values of the d-axis and q-axis, a speed command generator (302) for generating a speed command value, and a control unit (300) for adjusting a PWM signal from the command value. As a main circuit, a converter (309) for feeding a DC voltage to an inverter (308), the inverter (308) driven by the PWM signal, and a claw-teeth type motor (310) to be controlled are included. Further, as auxiliary devices for control, U-phase and W-phase current detectors (311) and (312) for detecting U-phase and W-phase currents fed to the electric motor (310) from the inverter (308), a position sensor (314) for detecting the position of the electric motor in rotation, and a voltage detector (315) for detecting an inverter input voltage Edc are included.

To the control unit (300), by the present invention, a correction unit (303) for correcting the q-axis current command value and a current correction amount calculating unit (304) for calculating the current correction amount to be superposed onto the correction unit are added. Further, the control unit (300), as an intrinsic controller, includes a voltage command computing unit (305) for computing voltage command values from the current command values of the d-axis and q-axis and the speed command value, a dq reverse conversion unit (306) for converting the voltage command values of the d-axis and q-axis to values on the three-phase alternating current axis of coordinates, a PWM generating unit (307) for generating a PWM signal from the voltage command values, and a dq coordinates conversion unit (313) for converting the respective current values detected by the electric motor to values on the rotation axis of coordinates.

As for the drive system shown in FIG. 3, the operation thereof will be explained.

Firstly, by the d-axis current command generator (301) shown in FIG. 3, current command values of the d-axis and q-axis are generated and a speed command value is generated by the speed command generator (302). By the correction unit (303), the q-axis current command value is corrected. The values used for correction are calculated by the current correction amount calculating unit (304). The respective current command values and speed command value are computed to voltage command values by the voltage command computing unit (305) and the computed voltage command values are converted from the values on the rotation axis of coordinates to values on the three-phase alternating current axis of coordinates by the dq reverse conversion unit (306). The converted voltage command values of the respective three phases are converted to PWM signals by the PWM generating unit (307).

To the inverter (308), a DC voltage is supplied via the converter (309) and a PWM signal is given from the PWM generating unit (307), thus the inverter (308) is driven and feeds three-phase alternating currents of variable voltages/frequencies to the claw-teeth type motor (310).

Here, the U-phase current value is detected by the U-phase current detector (311) and the W-phase current value is detected by the W-phase current detector (312). When the electric motor is Y-connected, if two currents among the three phases can be detected, the residual one can be calculated, so that a third detector is not necessary. Furthermore, the detected three-phase currents are converted from the values on the three-phase alternating current axis of coordinates to values on the rotation axis of coordinates by the dq coordinates conversion unit (313). The converted current values of the d-axis and q-axis are fed back and are used for voltage command calculation. Further, the position of the rotor is detected by the position sensor (314) and the obtained values are used for calculation at the time of dq coordinates conversion or dq reverse conversion.

Here, the effects of the correction unit (303) that is an essential section of the present invention will be explained.

In the claw-teeth type motor (310), the magnetic resistance of the intermediate phase (the V-phase) is small, and magnetic three-phase unbalance is caused in principle, and then the magnetic flux pulsations of the secondary electric angle are generated, and the torque pulsations of the same order are caused. To reduce the magnetic flux pulsations and torque pulsations, the correction unit (303) is installed. However, in the case of FIG. 3, similarly to FIG. 2, the detected three-phase currents are converted to the values on the rotation axis of coordinates, so that the d-axis current command value, q-axis current command value, and 0-phase current value must be corrected. However, actually, when intending to keep the control uncomplicated, if the d-axis current is controlled to 0, since the 0-phase current is 0 because the electric motor is Y-connected, as for the current command values to be corrected, only the q-axis current command value may be processed. The value of ΔIq that is necessary at that time, on the basis of analysis and measurement results by a prior simulation, is calculated by the current correction amount calculating unit (304). The calculated value is given to the correction unit (303), thus a reduction in the magnetic flux pulsations of the secondary electric angle and the torque pulsations of the same order is realized.

Here, in the case that the current fundamental wave vector is pointed in the q axial direction, the current command value is reduced using Formula (9).

Formula 9

$$i_d = 0$$
$$i_q = i_q^* \mp \Delta i_q \sin\left(2\theta_d + \frac{\pi}{6}\right) \quad (9)$$
$$i_0 = 0$$

A symbol θd shown in Formula (9), on the basis of the U-phase winding axis, indicates an angle from the basis to the d-axis. Here, to reduce the pulsations of the secondary electric angle that is peculiar to the claw-teeth type motor (310), a method for superposing a command value with a different amplitude on the intermediate phase current will be explained. However, similarly to the aforementioned, with respect to "minus/plus" shown in the formula, when the magnetic resistance of the intermediate phase is small, "minus" is used and inversely, when the magnetic resistance of the intermediate phase is large, "plus" is used.

Further, in the case of control of an electric motor having a structure that the magnetic resistance of the U-phase is different from those of other phases, Formula (10) is used.

Formula 10

$$i_d = 0$$
$$i_q = i_q^* \pm \Delta i_q \cos(2\theta_d) \quad (10)$$
$$i_0 = 0$$

Similarly, in the case of an electric motor having a structure that the magnetic resistance of the W-phase is different from those of other phases, Formula (11) is used.

Formula 11

$$i_d = 0$$
$$i_q = i_q^* \pm \Delta i_q \sin\left(2\theta_d - \frac{\pi}{6}\right) \quad (11)$$
$$i_0 = 0$$

Further, when an electric motor is composed of individual phases structured independently like the claw-teeth motor, there is a case that the phase relationship of the individual phases is not balanced due to a mounting position error of the individual phases. Also in such a case, pulsations of the second electric angle are generated, so that the unbalance can be coped with by changing the phase given in Formulas (9) to (11) in imitation of Formula (4).

Further, also the correction amount $\Delta i_q$ in this case, similarly to Formula (5), is calculated using Formula (12).

$$\Delta i_q = n[\%] \times i_q^* \quad (12)$$

Next, by referring to FIGS. 10 to 13, the control results will be explained.

FIGS. 10 to 13 show the simulation results aiming at the claw-teeth type motor having a small magnetic resistance of the intermediate phase.

Figure 10:
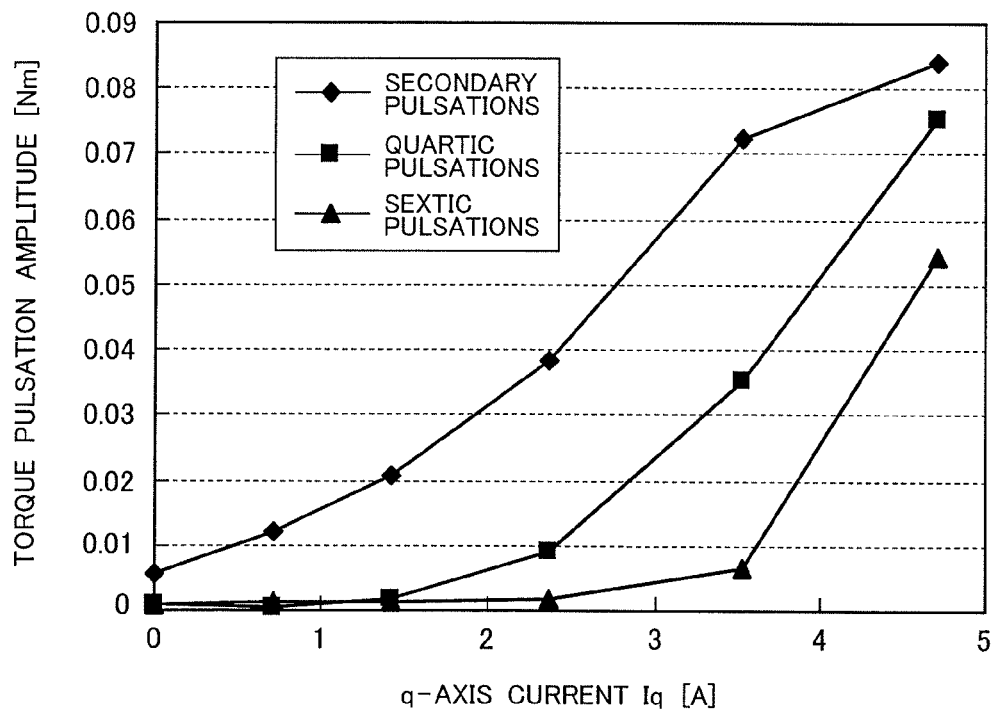
FIG. 10 is a torque pulsation characteristic diagram for the q-axis current of the claw-teeth type three-phase AC motor.
Figure 11:
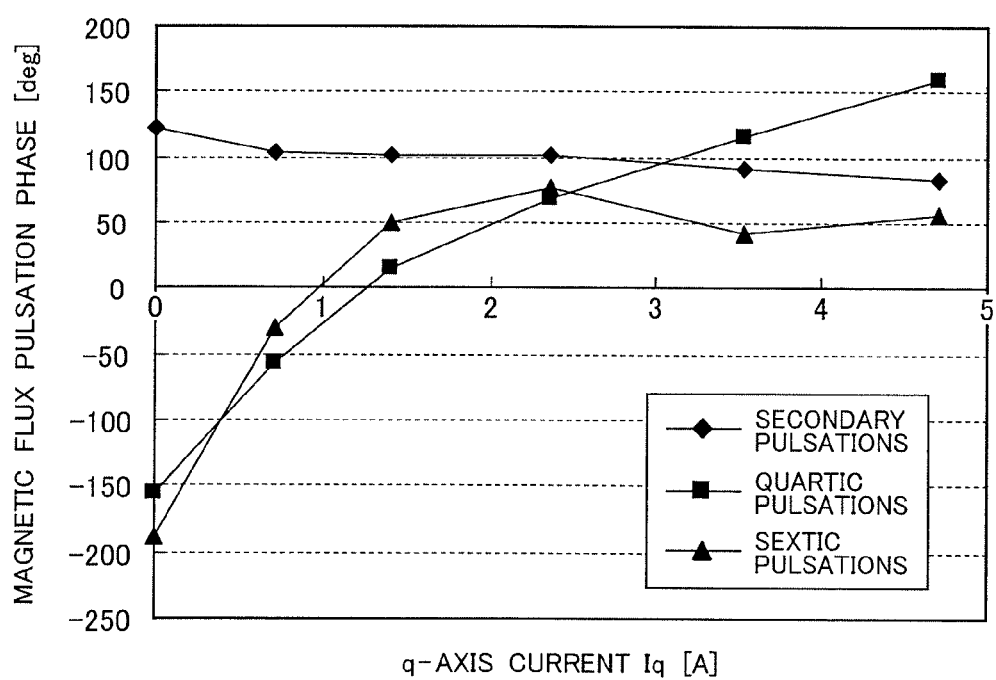
FIG. 11 is a magnetic flux pulsation phase characteristic diagram for the q-axis current of the claw-teeth type three-phase AC motor.
Figure 12:
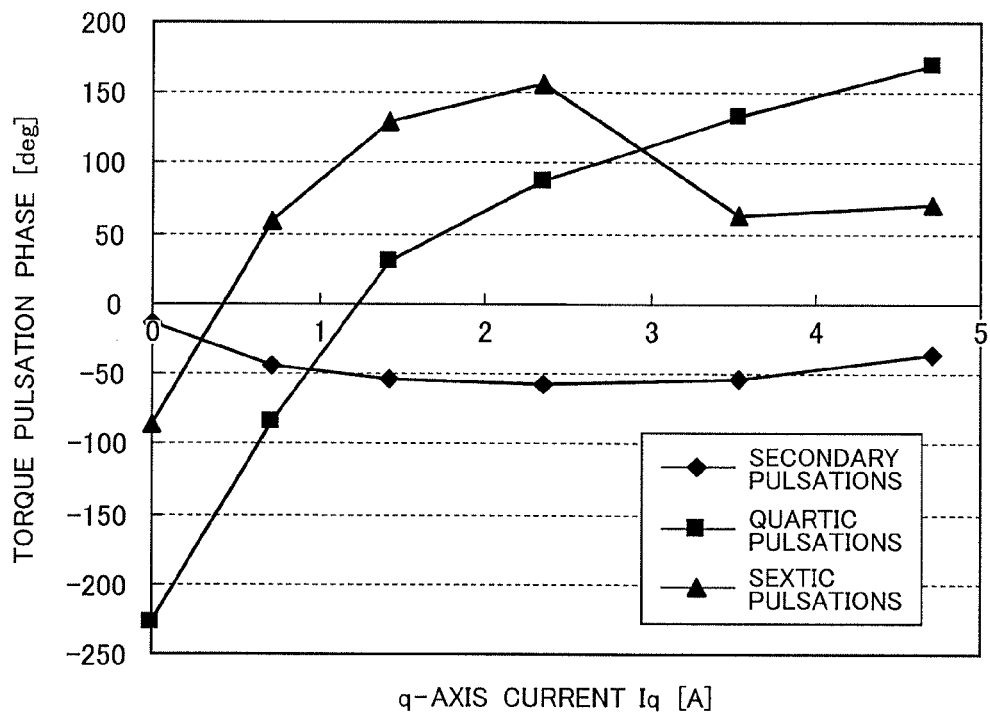
FIG. 12 is a torque pulsation phase characteristic diagram for the q-axis current of the claw-teeth type three-phase AC motor.

Here, the torque pulsation amplitude actually generated, as shown in FIG. 10, is apt to increase depending on the magnitude of the q-axis current. However, as shown in FIGS. 11 and 12, the secondary magnetic flux pulsations and torque pulsations, since the phase thereof is not changed due to the magnitude of the q-axis current, may be said to be almost fixed. Therefore, alternating currents of the secondary electric angle are superposed in a fixed phase, thus the secondary magnetic flux pulsations and the torque pulsations of the same order can be reduced.

Figure 13:
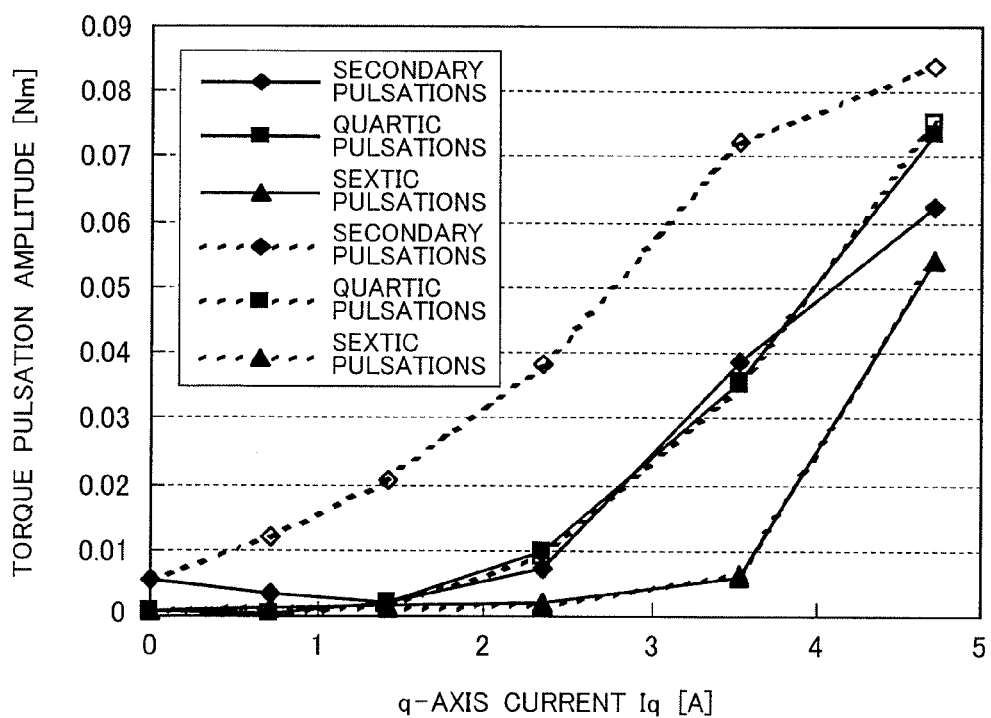
FIG. 13 is a characteristic diagram showing the reduction effect of the torque pulsation amplitude for the q-axis current of the claw-teeth type three-phase AC motor of an embodiment of the present invention.

FIG. 13 shows the simulation data obtained by execution of a pulsation reduction correction using Formula (12).

The results indicated by the dashed lines in the drawing are the data before executing the pulsation reduction correction and the results indicated by the solid lines are the data after executing the pulsation reduction correction. From FIG. 13, it may be said that the secondary pulsation amplitude can be reduced sufficiently.

Further, when intending to reduce the torque pulsations in a region having a large q-axis current Iq, if the value of n given in Formulas (5) and (12) is increased depending on the magnitude of a current command iq*, even in a large q-axis current region, a desired reduction in the torque pulsations can be realized.

(Fourth Embodiment)

Figure 4:
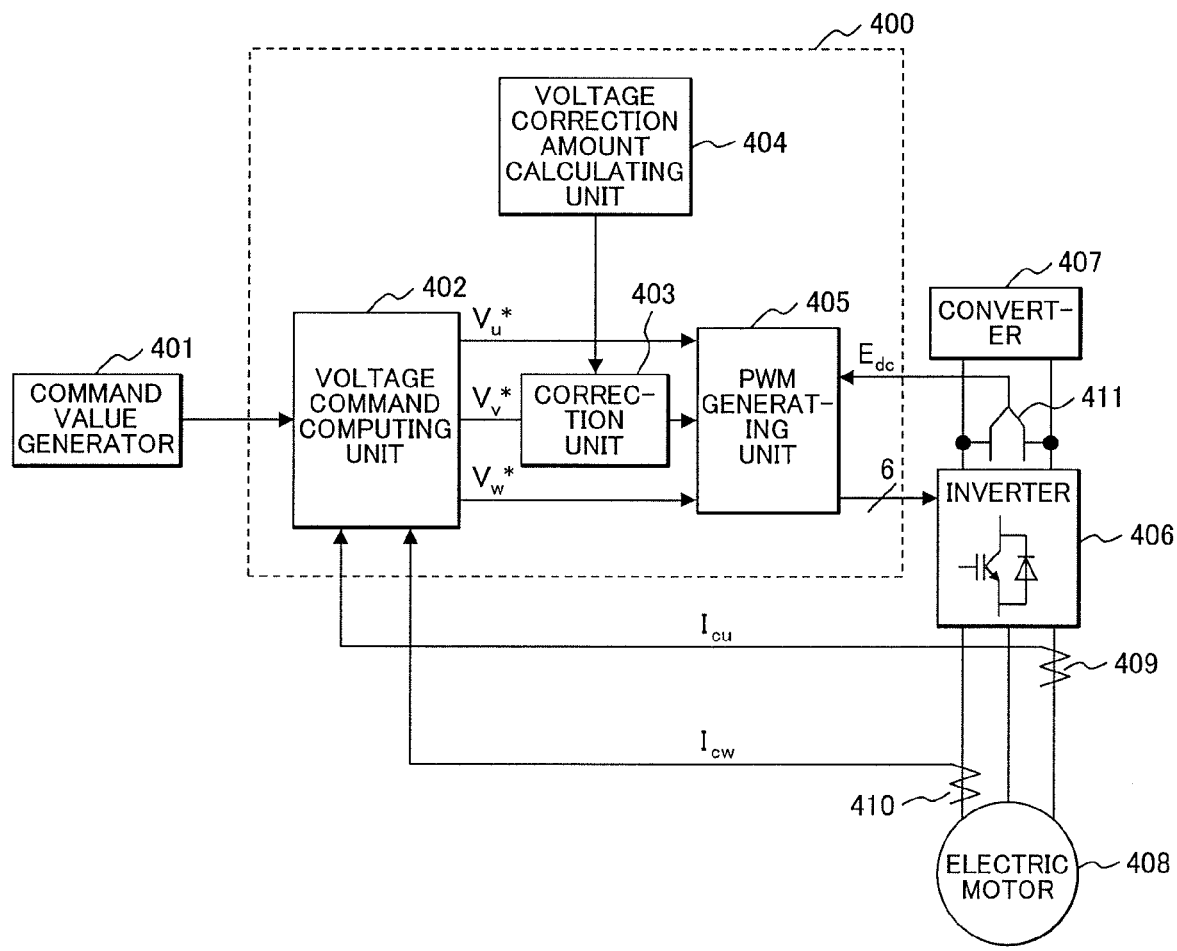
FIG. 4 is a block diagram showing the system constitution of the fourth embodiment of the driving device of the polyphase AC motor of the present invention.

FIG. 4 is a block diagram showing the system constitution of the fourth embodiment of the driving device of the polyphase AC motor of the present invention.

The controller of the driving device of the fourth embodiment includes a command value generator (401) for generating a command value for computing a voltage command value and a control unit (400) for adjusting a PWM signal from the command value.

As a main circuit, a converter (407) for feeding a DC voltage to an inverter (406), the inverter (406) driven by the PWM signal, and a claw-teeth type motor (408) to be controlled are included.

Further, as auxiliary devices for control, U-phase and W-phase current detectors (409) and (410) for detecting U-phase and W-phase currents fed to the electric motor (408) from the inverter (406) and a voltage detector (411) for detecting an inverter input voltage Edc are included.

The control unit (400), intrinsically includes a voltage command computing unit (402) for computing a voltage command value from the command value and a PWM generating unit (405) for generating a PWM signal from the voltage command value. Further, to the control unit (400), by the present invention, a correction unit (403) for correcting an intermediate phase (the V-phase) voltage command value and a voltage correction amount calculating unit (404) for calculating a value used for the correction are added.

As for the drive system shown in FIG. 4, the operation thereof will be explained.

Firstly, by the command value generator (401) shown in FIG. 4, command values for computing the voltage command values are generated. The generated command values are computed to voltage command values by the voltage command computing unit (402). Among them, the voltage command value of the intermediate phase (the V-phase) is corrected by the correction unit (403). The values used for correction are calculated by the voltage correction amount calculating unit (404). The voltage command values of the respective three phases are converted to PWM signals by the PWM generating unit (405).

To the inverter (406), a DC voltage is supplied via the converter (407) and a PWM signal is given from the PWM generating unit (405), thus the inverter (406) is driven and feeds three-phase alternating currents of variable voltages/frequencies to the claw-teeth type motor (408).

Here, the U-phase current value is detected by the U-phase current detector (409) and the W-phase current value is detected by the W-phase current detector (410). Similarly to the aforementioned, when the electric motor is Y-connected, if the currents of two phases among the three phases can be detected, the residual one phase can be calculated, and the respective detected current values are fed back and are used for voltage command value calculation.

Here, the effects of the correction unit (403) that is an essential section of the present invention will be explained.

In the claw-teeth type motor (408), the magnetic resistance of the intermediate phase (the V-phase) is small, and magnetic three-phase unbalance is caused in principle, and then the magnetic flux pulsations of the secondary electric angle are generated, and the torque pulsations of the same order are caused. To reduce the magnetic flux pulsations and torque pulsations, the correction unit (403) is installed. However, in the case of FIG. 4, unlike the aforementioned embodiments, the current command values are not corrected but the amplitude of the voltage command value for the output voltage of the inverter (406) supplied to the electric motor (408) is corrected.

The voltage correction amount that is necessary at that time, on the basis of analysis and measurement results by a prior simulation, is calculated by the voltage correction amount calculating unit (404). The calculated value is given to the correction unit (403), thus a reduction in the magnetic flux pulsations of the secondary electric angle and the torque pulsations of the same order is realized.

(Fifth Embodiment)

Figure 5:
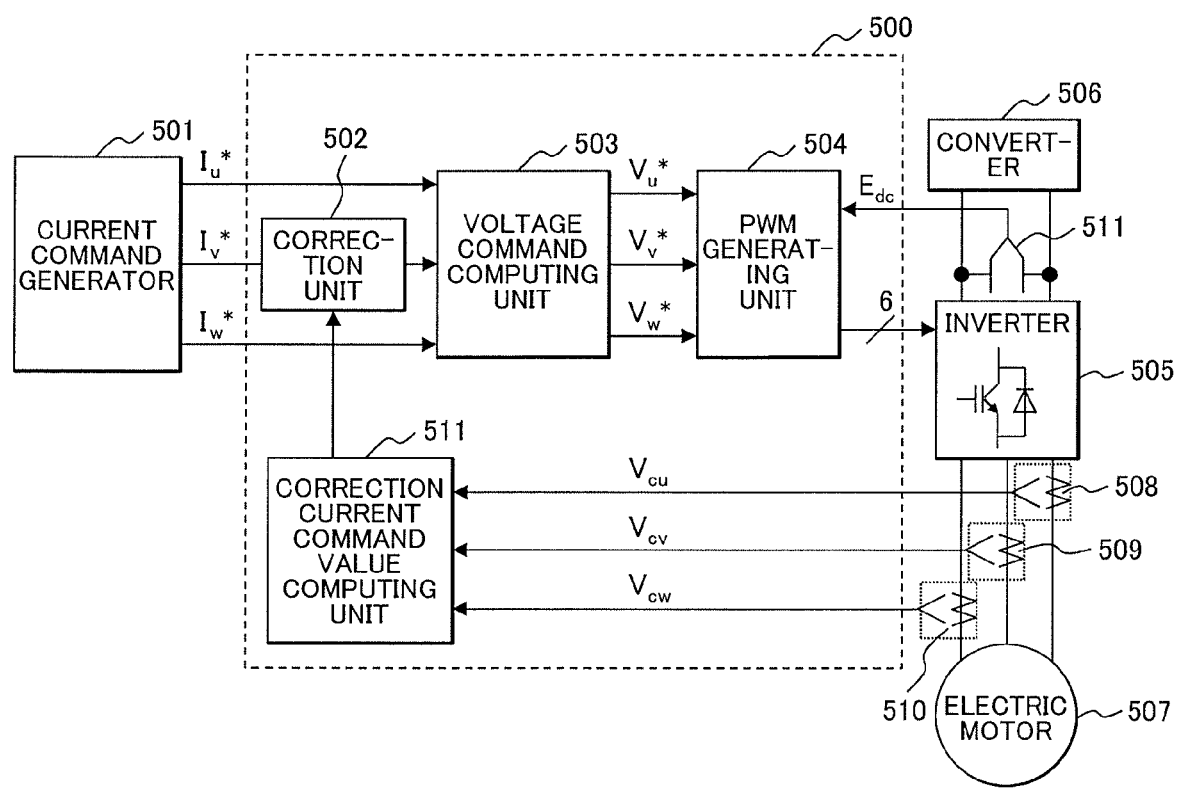
FIG. 5 is a block diagram showing the system constitution of the fifth embodiment of the driving device of the polyphase AC motor of the present invention.

FIG. 5 is a block diagram showing the system constitution of the fifth embodiment of the driving device of the polyphase AC motor of the present invention.

The controller of the driving device of the fifth embodiment includes a current command generator (501) for generating a current command value for driving the electric motor and a control unit (500) for adjusting a PWM signal from the command value.

As a main circuit, an inverter (505) driven by the PWM signal, a converter (506) for feeding a DC voltage to the inverter (505), and a claw-teeth type motor (507) to be controlled are included.

Further, as auxiliary devices for control, U-phase to W-phase voltage detectors (508) to (510) for detecting U-phase to W-phase voltages fed to the electric motor from the inverter (505) and a voltage detector (511) for detecting an inverter input voltage Edc are included.

The control unit (500), intrinsically includes a voltage command computing unit (503) for computing a voltage command value from the current command value and a PWM generating unit (504) for generating a PWM signal from the voltage command value.

Here, by the present invention, to the control unit (500), a correction unit (502) for correcting an intermediate phase (the V-phase) current among the current command values and a correction current command value computing unit (511) for computing the correction value used for the correction unit (502) during run are added.

As for the drive system shown in FIG. 5, the operation thereof will be explained.

Firstly, by the current command generator (501) shown in FIG. 5, current command values of the respective three phases are generated. Among the generated current command values, the intermediate phase (the V-phase) current is corrected by the correction unit (502).

In this embodiment, unlike the aforementioned embodiments, the values used for the correction are calculated by the correction current command value computing unit (511) while running. The correction current command value computing unit (511) inputs output Vcu to Vcw of U-phase to W-phase voltage detectors (508) to (510) for detecting U-phase to W-phase voltages supplied to the electric motor (507) by the inverter (505) and computes necessary current correction amounts. The relationship between the detected voltages and the necessary current correction amounts, on the basis of analysis and measurement results by a prior simulation, is preset by the correction current command value computing unit (511).

The current command values of the respective three phases are computed to voltage command values by the voltage command computing unit (503). The computed voltage command values are converted to PWM signals by the PWM generating unit (504).

To the inverter (505), a DC voltage is supplied via the converter (506) and a PWM signal is given from the PWM generating unit (504), thus the inverter (505) is driven and feeds three-phase alternating currents of variable voltages/frequencies to the claw-teeth type motor (507).

Here, by referring to FIG. 6, the effects of the correction unit (502) that is an essential section of the present invention will be explained.

Figure 6:
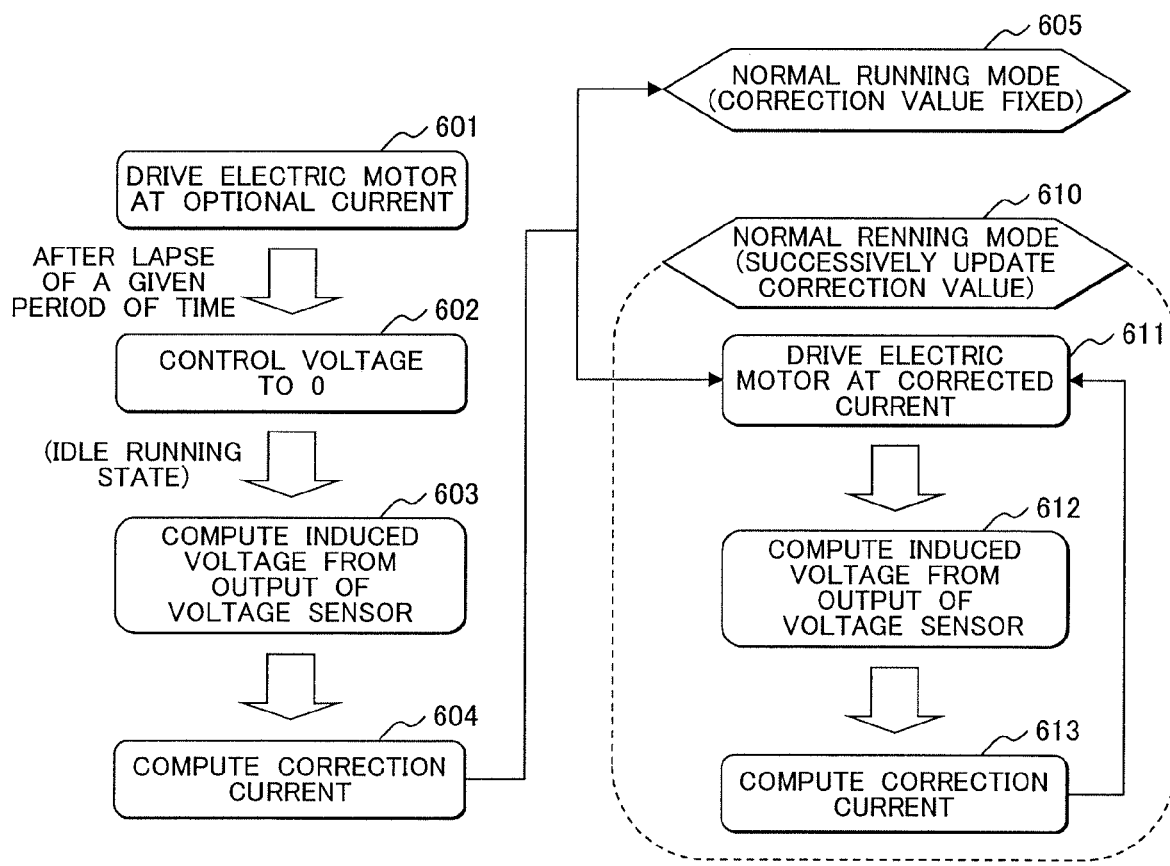
FIG. 6 is a processing flow chart for illustrating the fifth embodiment of the present invention.

FIG. 6 is a processing flow chart for illustrating the fifth embodiment of the present invention.

In the claw-teeth type motor (507), the magnetic resistance of the intermediate phase (the V-phase) is small, and magnetic three-phase unbalance is caused in principle, and then the magnetic flux pulsations of the secondary electric angle are generated, and the torque pulsations of the same order are caused. To reduce the magnetic flux pulsations and torque pulsations, the correction unit (502) is installed. As shown in FIG. 6, firstly, at Step 601, the electric motor is driven at an optional current, and after a given period of time, at Step 602, the voltage is reduced to 0. After the voltage is reduced to 0, in the free run state, using the U-phase to W-phase voltage detectors (508) to (510), at Step 603, an induced voltage is computed from the voltage value. Furthermore, at Step 604, from the computed induced voltage, the current command value whose amplitude is corrected by the correction current command value computing unit (511) is computed. The computed current command value is fetched by the correction unit (502), thus in the normal running mode at Step 605, the torque pulsations of the electric motor can be reduced.

On the other hand, by driving the electric motor at the current corrected at Step 611 in the normal running state at Step 610 and by computing the induced voltage at Step 612 and computing the correction current at Step 612, any of the modes updated as required can be coped with.

(Sixth Embodiment)

Figure 7:
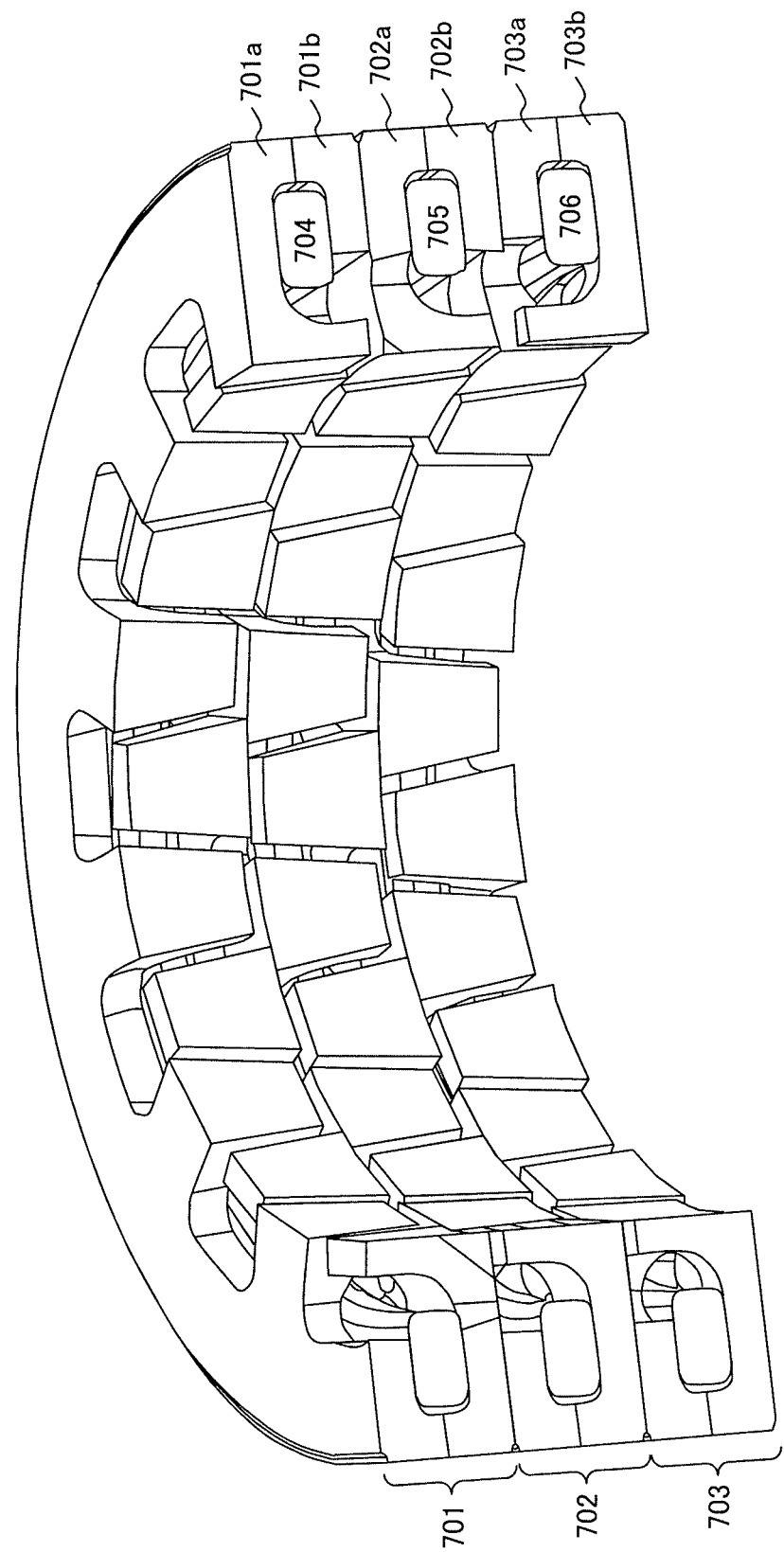
FIG. 7 is a cross sectional perspective view showing the outline of the stator structure of the claw-teeth motor showing the sixth embodiment of the present invention.

FIG. 7 is a cross sectional perspective view showing the outline of the stator structure of the claw-teeth motor showing the sixth embodiment of the present invention. The sixth embodiment is an embodiment relating to the pulsation reduction method viewed from the structure of the claw-teeth motor that is mentioned previously as an example to be controlled.

In FIG. 7, a U-phase stator (701) is structured so that a claw magnetic pole (701a) on the upper side of the U phase and a claw magnetic pole (701b) on the lower side of the U phase are set to each other so that the respective claws are adjoined with each other. This structure is an almost similar structure to the exploded perspective view of the aforementioned patent literature shown in FIG. 4. Further, the V phase and W phase have a similar structure and the claw magnetic poles are shifted and overlaid in the rotational direction by an electric angle of $2\pi/3$ each, thus the stator magnetic poles of the three phases are formed. Namely, as for the V phase, an upper side claw magnetic pole (702a) and a lower side claw magnetic pole (702b) are structured similarly to the U phase, and both magnetic poles are shifted from the U-phase stator (701) in the peripheral direction by an electric angle of $2\pi/3$ and are overlaid by each other in the axial direction, thus a V-phase stator (702) is formed. Further, as for the W phase, an upper side claw magnetic pole (703a) and a lower side claw magnetic pole (703b) are structured similarly to the U phase and V phase, and both magnetic poles are shifted from the V-phase stator (702) in the peripheral direction by an electric angle of $2\pi/3$ and are overlaid by each other in the axial direction, thus a W-phase stator (703) is formed. Furthermore, a U-phase winding (704) arranged in the U-phase stator (701) in the peripheral direction, a V-phase winding (705) arranged in the V-phase stator in the peripheral direction, and a W-phase winding (706) arranged in the W-phase stator in the peripheral direction are included.

The claw-teeth type motor has such a structure, so that the magnetic resistance of the V-phase stator (702) not facing air is reduced. Therefore, the electric motor brings a three-phase unbalance property in principle and causes magnetic pulsations and torque pulsations. Therefore, as a material of the V-phase core (702), a material of lower magnetic permeability than those of other phases is used to increase the magnetic resistance.

By doing this, the similar effects to Embodiments 1 to 5 can be obtained.

(Seventh Embodiment)

Figure 8:
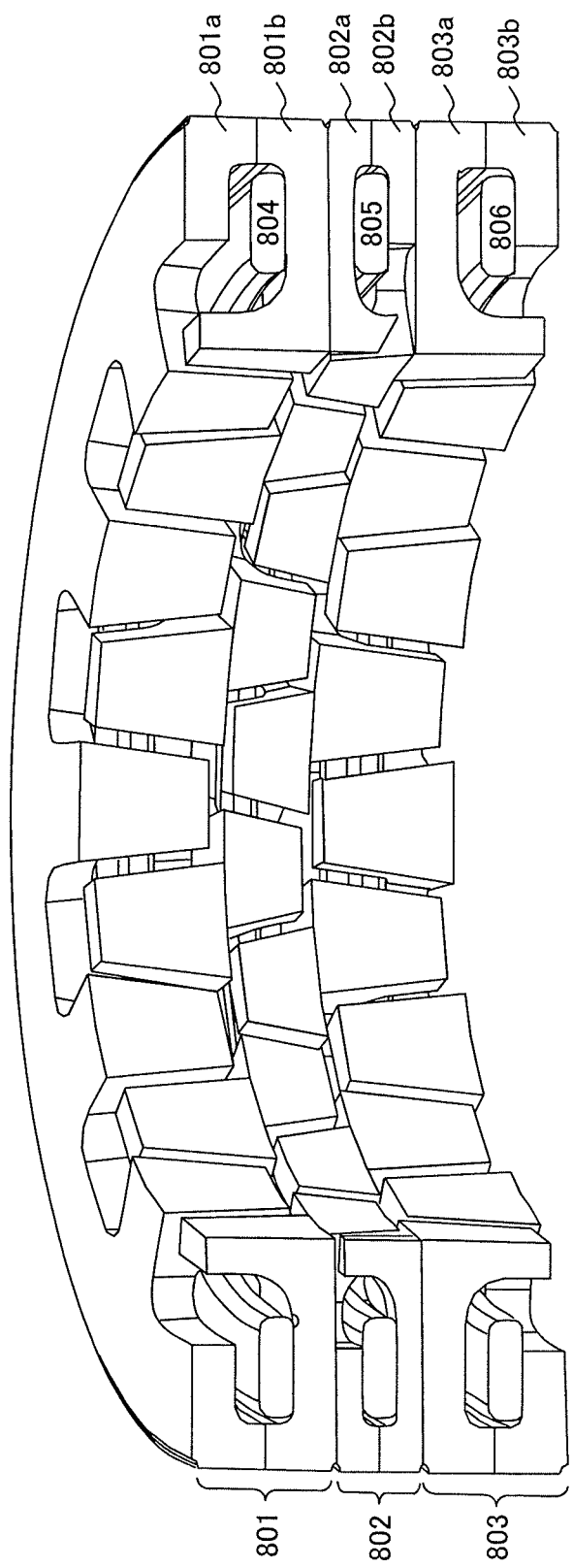
FIG. 8 is a cross sectional perspective view showing the outline of the stator structure of the claw-teeth motor showing the seventh embodiment of the present invention.

FIG. 8 is a cross sectional perspective view showing the outline of the stator structure of the claw-teeth motor showing the seventh embodiment of the present invention. The seventh embodiment, similarly to the sixth embodiment explained in FIG. 7, is also an embodiment relating to the pulsation reduction method viewed from the structure of the claw-teeth motor.

The seventh embodiment shortens the size of a V-phase core (802) in the axial direction, thereby increases the magnitude of the magnetic resistance, and produces the similar effects to the embodiments 1 to 5.

(Eighth Embodiment)

Figure 9:
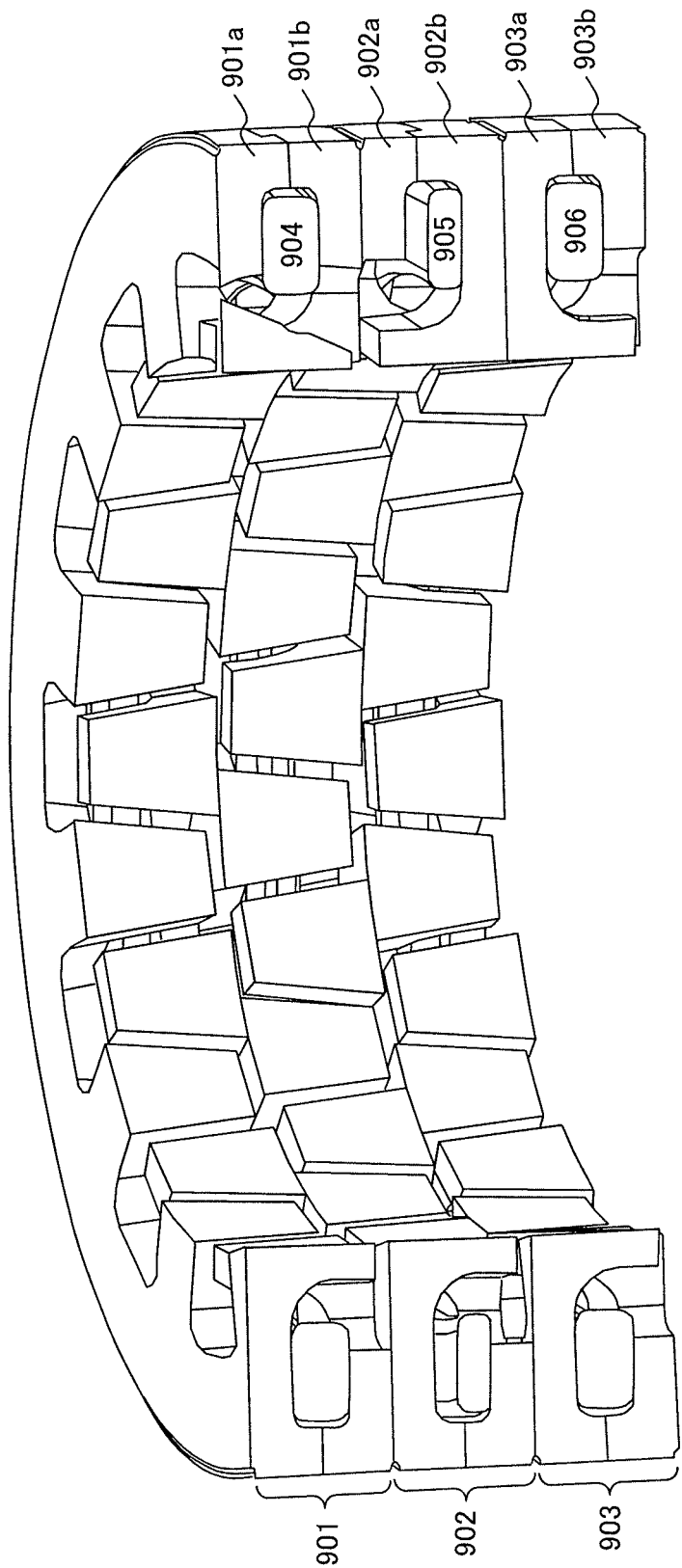
FIG. 9 is a cross sectional perspective view showing the outline of the stator structure of the claw-teeth motor showing the eighth embodiment of the present invention.

FIG. 9 is a cross sectional perspective view showing the outline of the stator structure of the claw-teeth motor showing the eighth embodiment of the present invention. The eighth embodiment, similarly to the sixth and seventh embodiments explained in FIGS. 7 and 8, is also an embodiment relating to the pulsation reduction method viewed from the structure of the claw-teeth motor.

The eighth embodiment reduces the number of turns of a V-phase core coil (905) than those of a U-phase coil (904) and a W-phase coil (906), thereby makes the generated magnetic flux of the three phases uniform, and can produce the similar effects to the embodiments 1 to 5.

(Ninth Embodiment)

Figure 14:
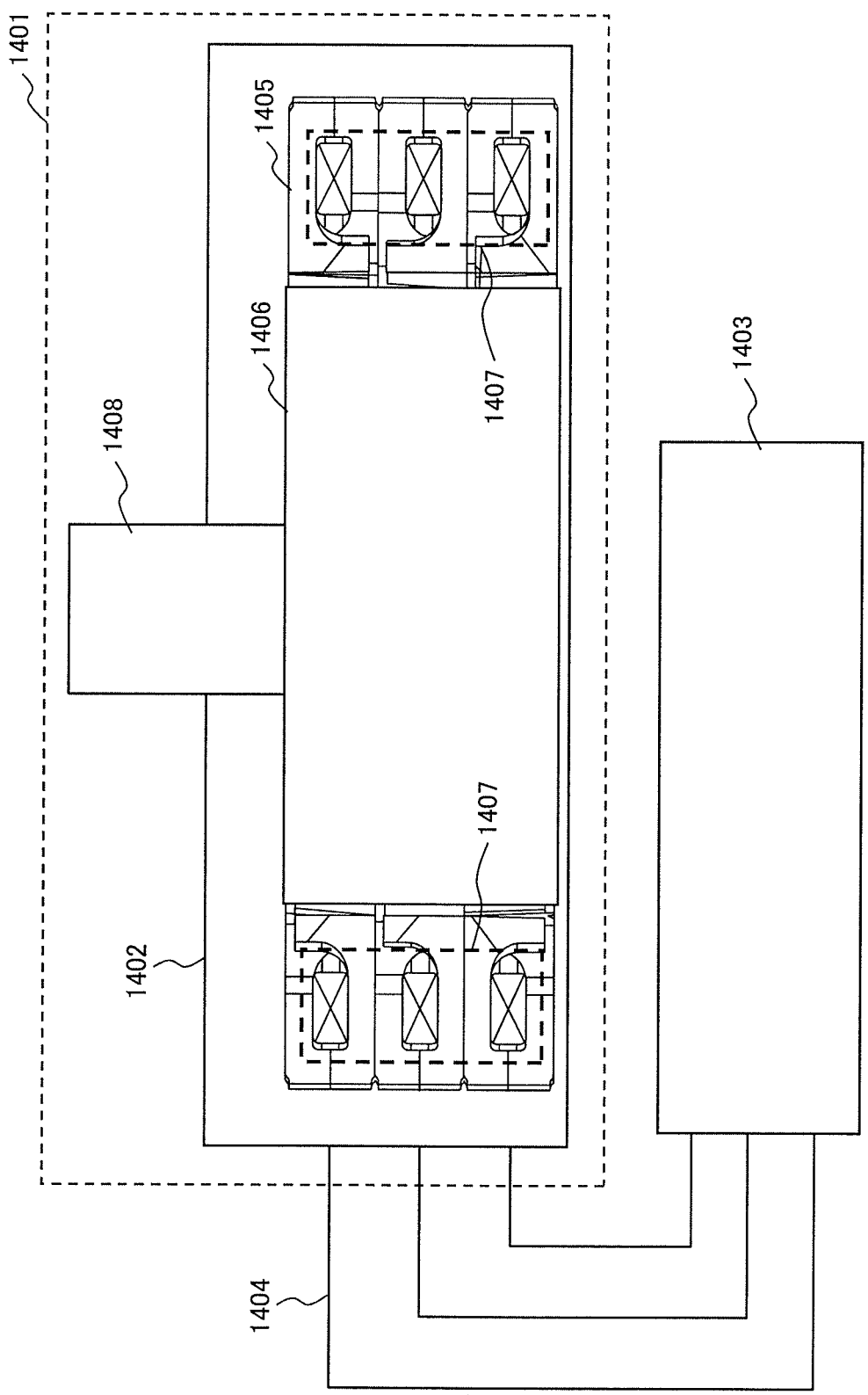
FIG. 14 is a schematic block diagram showing the ninth embodiment of the driving device of the polyphase AC motor of the present invention.

FIG. 14 is a schematic block diagram showing the ninth embodiment of the driving device of the polyphase AC motor of the present invention.

The system shown in FIG. 14 is composed of a three-phase alternating current motor (1401), a cabinet (1402) of the electric motor (1401), a control unit (1403), and a line (1404) for connecting the electric motor (1401) and the control unit (1403). The electric motor (1401) is composed of a stator (1405), a rotor (1406), a coil (1407), and an output shaft (1408) and from the control unit (1403) via the line (1404), an alternating current is fed to the electric motor (1401). Due to the fed voltage, an alternating current flows through the coil (1407), and a rotating magnetic field is generated in the stator (1405), and the rotor (1406) rotates in synchronization with the rotating magnetic field, and turning force is generated in the output shaft (1408).

(Tenth Embodiment)

Figure 15:
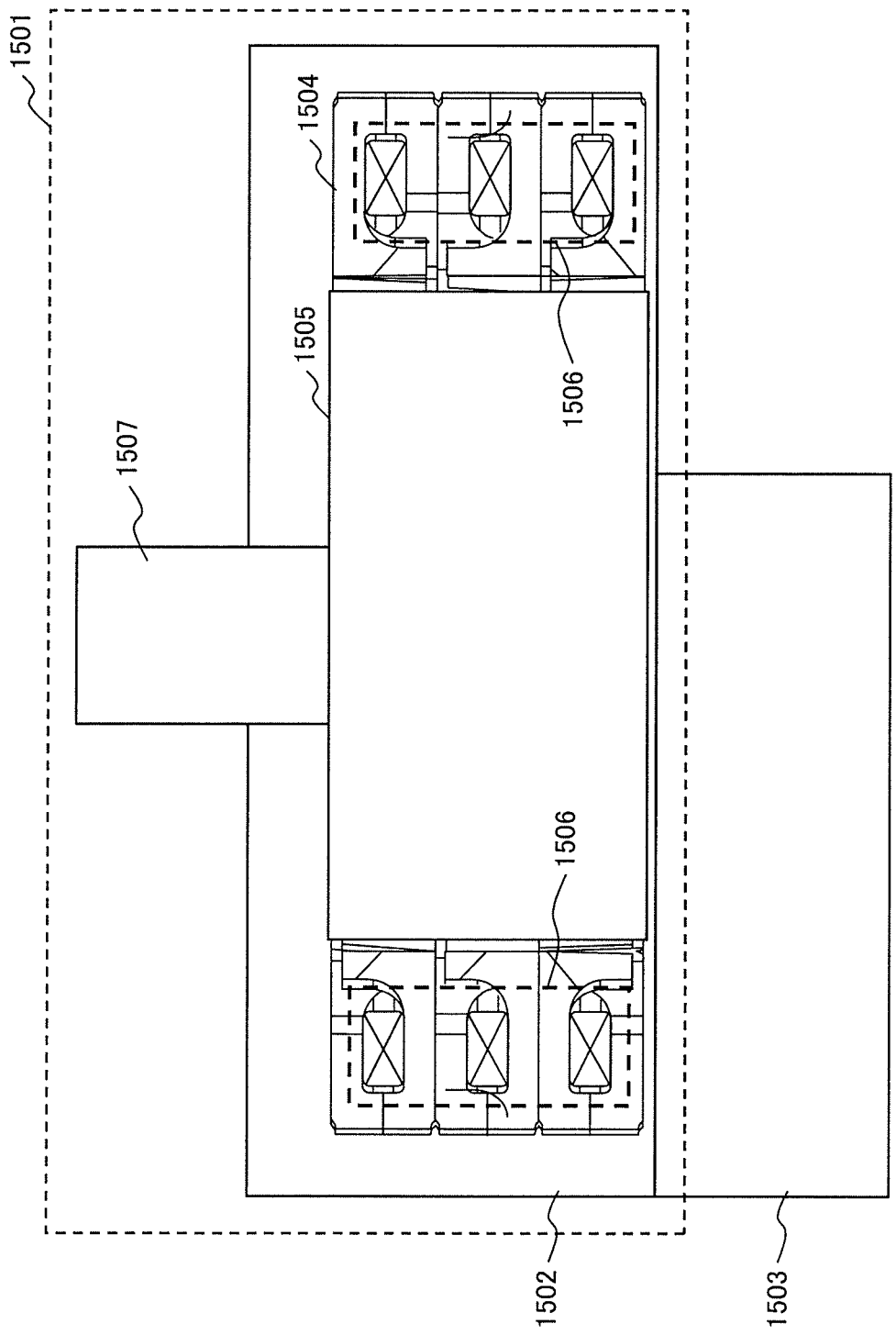
FIG. 15 is a schematic block diagram showing the tenth embodiment of the driving device of the polyphase AC motor of the present invention.

FIG. 15 is a schematic block diagram showing the tenth embodiment of the driving device of the polyphase AC motor of the present invention.

The system shown in FIG. 15 is composed of a polyphase AC motor (1501), a cabinet (1502) of the electric motor (1501), and a control unit (1503) integrally stored in the cabinet (1502). The electric motor (1501) is composed of a stator (1504), a rotor (1505), a coil (1506), and an output shaft (1507).

From the control unit (1503), an alternating current is fed to the coil (1506), thus an alternating current flows through the coil (1506), and a rotating magnetic field is generated in the stator (1504), and the rotor (1505) rotates in synchronization with the rotating magnetic field, and turning force is fed to a driven article via the output shaft (1507).

This embodiment is summarized as indicated below. Firstly, the polyphase AC motor (1501), as described in detail in the previous embodiments, includes a plurality of upper side and lower side claw magnetic poles installed inside the stator core, a stator magnetic pole of one phase structured so as to get caught in a ring-shaped coil between the upper side and lower side claw magnetic poles, and stator magnetic poles of m phases in which the stator magnetic poles of one phase are overlaid and arranged in m phases in the axial direction by shifting the stator magnetic pole of one phase in the rotational direction at an interval of 2π/m each of an electric angle. And, the polyphase AC motor (1501) is a claw-teeth type polyphase AC motor including the rotor (1505) supported rotatably via predetermined air gaps on the inner periphery side of the claw magnetic poles. Further, the electric motor (1501) includes an inverter which is integrally stored in the cabinet (1502) of the polyphase AC motor (1501) and supplies polyphase alternating currents of variable voltages/frequencies due to pulse width modulation to the polyphase AC motor and the control unit (1503) including a correction unit for putting the amplitude of an alternating current to be supplied to at least one phase of the stator magnetic poles into an unbalanced state with the amplitudes of the alternating currents to be supplied to other phases for controlling the inverter.

In this system, there is no wire used for connecting the electric motor (1501) and the control unit (1503), and the two are formed integrally, so that noise caused by the wire is eliminated, and a space for wiring is not necessary.

Legend 100 to 500: Control unit; 101, 202, 301, 501: Current command generator; 102, 203, 303, 403, 502: Correction unit; 103, 204, 304: Current correction amount calculating unit; 104, 205, 305, 402, 503: Voltage command computing unit; 105, 207, 307, 405, 504: PWM generating unit; 106, 208, 308, 406, 505: Inverter; 107, 209, 309, 407, 506: Converter; 108, 210, 310, 408, 507: Electric motor (claw-teeth type AC motor); 109, 211, 311, 409, 508: U-phase current detector; 212: V-phase current detector; 508: U-phase voltage detector; 509: V-phase voltage detector; 510: W-phase voltage detector; 110, 213, 312, 410: W-phase current detector; 201, 302: Speed command generator; 206, 306: dq reverse conversion unit (coordinate corresponding value converter: two-phase rotation coordinate system→three-phase fixed coordinate system); 214, 313: dq coordinate conversion unit (coordinate corresponding value converter: three-phase fixed coordinate system→two-phase rotation coordinate system); 215, 314: Rotor position sensor; 401: Command value generator; 404: Voltage correction amount calculating unit; 511: Correction current command value computing unit; 701, 801, 901: U-phase core of claw-teeth type motor; 701a, 801a, 901a: U-phase upper side claw magnetic pole of claw-teeth type motor; 701b, 801b, 901b: U-phase lower side claw magnetic pole of claw-teeth type motor; 702, 802, 902: V-phase core of claw-teeth type motor; 702a, 802a, 902a: V-phase upper side claw magnetic pole of claw-teeth type motor; 702b, 802b, 902b: V-phase lower side claw magnetic pole of claw-teeth type motor; 703, 803, 903: W-phase core of claw-teeth type motor; 703a, 803a, 903a: W-phase upper side claw magnetic pole of claw-teeth type motor; 703b, 803b, 903b: W-phase lower side claw magnetic pole of claw-teeth type motor; 704, 804, 904: U-phase coil of claw-teeth type motor; 705, 805, 905: V-phase coil of claw-teeth type motor; 706, 806, 906: W-phase coil of claw-teeth type motor

What is claimed is:

1. A driving device for a polyphase AC motor having polyphase stator magnetic poles formed independently for each of a plurality of phases, said driving device comprising:

an inverter for supplying polyphase alternating currents of variable voltages/frequencies due to pulse width modulation to said polyphase AC motor, and a control unit for controlling said inverter, wherein:

a magnetic resistance of at least one of said phases of said stator magnetic poles is different from magnetic resistances of others of said phases of said stator magnetic poles, said control unit includes a correction unit for calculating a correction to reduce magnetic flux pulsations of a secondary electric angle by setting an amplitude and/or a phase of an alternating current to be supplied to at least one of said phases of said stator magnetic poles that is different from amplitudes and/or phases of alternating currents to be supplied to others of said phases of said stator magnetic poles, and said correction is calculated in said correction unit before supplying said polyphase alternating currents to said polyphase AC motor.

2. The driving device according to claim 1, wherein said correction unit sets said amplitude of said alternating current to be supplied to said phase of said stator magnetic pole having said different magnetic resistance.

3. The driving device according to claim 2, wherein said polyphase AC motor is a claw-teeth type m-phase AC motor including:
  a plurality of upper side and lower side claw magnetic poles installed inside a stator core,
  a stator magnetic pole of one phase structured so as to get caught in a ring-shaped coil between said upper side and lower side claw magnetic poles,
  stator magnetic poles of m phases structured so as to arrange said stator magnetic pole of one phase in an axial direction by shifting said stator magnetic pole of one phase at an interval of 2π/m of an electric angle, and
  rotors supported rotatably via predetermined air gaps on an inner periphery side of said claw magnetic poles.

4. The driving device according to claim 2, wherein said correction unit sets said amplitude of said alternating current to a phase whose mounting position is unbalanced with mounting positions of other phases.

5. The driving device according to claim 1, wherein said polyphase AC motor is a claw-teeth type m-phase AC motor including:
  a plurality of upper side and lower side claw magnetic poles installed inside a stator core,
  a stator magnetic pole of one phase structured so as to get caught in a ring-shaped coil between said upper side and lower side claw magnetic poles,
  stator magnetic poles of m phases structured so as to arrange said stator magnetic pole of one phase in an axial direction by shifting said stator magnetic pole of one phase at an interval of 2π/m of an electric angle, and
  rotors supported rotatably via predetermined air gaps on an inner periphery side of said claw magnetic poles.

6. The driving device according to claim 1, wherein said correction unit sets said amplitude of said alternating current to a phase whose mounting position is unbalanced with mounting positions of other phases.

7. The driving device according to claim 1, wherein said correction unit superposes an alternating current of a secondary electric angle onto at least one command value among current or voltage command values of a d-axis and a q-axis in a rotation coordinate system of said polyphase AC motor.

8. The driving device according to claim 1, wherein said correction unit superposes an alternating current of a primary electric angle onto a 0-phase current or voltage command value in a rotation coordinate system of said polyphase AC motor.

9. The driving device according to claim 1, wherein said correction unit receives an output of a correction amount calculating unit for calculating said correction based on results of preanalysis or premeasurement, and sets said amplitude and/or said phase according to said output.

10. A driving method for supplying, from an inverter, polyphase alternating currents of variable voltages/frequencies due to pulse width modulation to a polyphase AC motor having polyphase stator magnetic poles that are, formed independently for each of a plurality of phases, said driving method comprising:
  calculating a correction to reduce magnetic flux pulsations of a secondary electric angle by setting an amplitude and/or a phase of an alternating current to be supplied to at least one of said phases of said stator magnetic poles that is different from amplitudes and/or phases of alternating currents to be supplied to others of said phases of said stator magnetic poles, wherein:
  a magnetic resistance of at least one of said phases of said stator magnetic poles is different from magnetic resistances of others of said phases of said stator magnetic poles, and
  said correction is calculated before supplying said polyphase alternating currents to said polyphase AC motor.

11. The driving method according to claim 10, wherein said correction is calculated based on results of preanalysis or premeasurement.

12. A driving device for a claw-teeth type polyphase AC motor including:
  a plurality of upper side and lower side claw magnetic poles installed inside a stator core,
  a stator magnetic pole of one phase structured so as to get caught in a ring-shaped coil between said upper side and lower side claw magnetic poles,
  stator magnetic poles of m phases structured so as to overlay and arrange said stator magnetic pole of one phase in m phases in an axial direction by shifting said stator magnetic pole of one phase in a rotational direction at an interval of 2π/m each of an electric angle, and
  rotors supported rotatably via predetermined air gaps on an inner periphery side of said claw magnetic poles,
  said driving device comprising:
  an inverter which is integrally stored in a casing of said polyphase AC motor and supplies polyphase alternating currents of variable voltages/frequencies due to pulse width modulation to said polyphase AC motor, and
  a control unit for controlling said inverter, wherein:
  a magnetic resistance of at least one of said phases of said stator magnetic poles is different from magnetic resistances of others of said phases of said stator magnetic poles,
  said control unit includes a correction unit for calculating a correction to reduce magnetic flux pulsations of a secondary electric angle by setting an amplitude of an alternating current to be supplied to at least one of said phases of said stator magnetic poles that is different from amplitudes of alternating currents to be supplied to others of said phases of said stator magnetic poles, and
  said correction is calculated in said correction unit before supplying said polyphase alternating currents to said polyphase AC motor.

* * * * *